(12) United States Patent
Giaimo et al.

(10) Patent No.: US 7,901,178 B2
(45) Date of Patent: Mar. 8, 2011

(54) INNER DIAMETER VANE SHROUD SYSTEM HAVING ENCLOSED SYNCHRONIZING MECHANISM

(75) Inventors: John A. Giaimo, Weston, FL (US); John P. Tirone, III, Moodus, CT (US)

(73) Assignee: United Technologies Corporation, Hartford, CT (US)

( * ) Notice: Subject to any disclaimer, the term of this patent is extended or adjusted under 35 U.S.C. 154(b) by 78 days.

(21) Appl. No.: 12/406,346

(22) Filed: Mar. 18, 2009

(65) Prior Publication Data

US 2009/0285673 A1 Nov. 19, 2009

Related U.S. Application Data

(63) Continuation of application No. 11/185,623, filed on Jul. 20, 2005, now Pat. No. 7,588,415.

(51) Int. Cl.
*F01D 17/16* (2006.01)
(52) U.S. Cl. .......................................... 415/160
(58) Field of Classification Search .................. 415/150, 415/159–165
See application file for complete search history.

(56) References Cited

U.S. PATENT DOCUMENTS

| | | | |
|---|---|---|---|
| 2,233,983 A | 3/1941 | Kice, Jr. |
| 2,424,839 A | 7/1947 | Morton |
| 2,455,251 A | 11/1948 | Hersey |
| 2,805,818 A | 9/1957 | Ferri |
| 2,917,275 A | 12/1959 | Magin |
| 2,933,234 A | 4/1960 | Neumann |
| 2,994,509 A | 8/1961 | Walker |
| 3,025,036 A | 3/1962 | Kumm et al. |
| 3,113,430 A | 12/1963 | Beale et al. |
| 3,314,654 A | 4/1967 | Thenault et al. |
| 3,352,537 A | 11/1967 | Petrie |
| 3,632,224 A | 1/1972 | Wright et al. |
| 3,685,920 A | 8/1972 | Burge |
| 3,816,021 A | 6/1974 | Lewis et al. |
| 3,836,281 A | 9/1974 | Czuszak |
| 3,836,327 A | 9/1974 | Bartsch |
| 3,908,362 A | 9/1975 | Szydlowski |
| 4,044,815 A | 8/1977 | Smashey et al. |
| 4,239,450 A | 12/1980 | Geitner et al. |
| 4,695,220 A | 9/1987 | Dawson |
| 4,792,277 A | 12/1988 | Dittberner, Jr. et al. |
| 4,812,106 A | 3/1989 | Purgavie |
| 4,834,613 A | 5/1989 | Hansen et al. |

(Continued)

FOREIGN PATENT DOCUMENTS

GB            601828            5/1948

(Continued)

*Primary Examiner* — Christopher Verdier
(74) *Attorney, Agent, or Firm* — Kinney & Lange, P.A.

(57) ABSTRACT

A variable vane mechanism comprises a variable vane, an inner diameter shroud and a synchronizing mechanism. The variable vane comprises a vane body, an inner diameter trunnion extending radially inwardly from the vane body, and a button connected to the inner diameter trunnion and displaced radially inwardly from the inner diameter trunnion. The shroud comprises a shroud body, a socket extending into the shroud body for receiving the inner diameter trunnion, a flange extending into the socket for engaging the button and inhibiting radial movement of the variable vane, and a synchronizing channel extending through the inner diameter shroud aft of the socket so as to be bounded by the shroud body and opening to the socket. The synchronizing mechanism is disposed inside the synchronizing channel and connects to the inner diameter trunnion.

19 Claims, 3 Drawing Sheets

U.S. PATENT DOCUMENTS

| | | |
|---|---|---|
| 4,836,746 A | 6/1989 | Owsianny et al. |
| 4,990,056 A | 2/1991 | McClain et al. |
| 5,024,580 A | 6/1991 | Olive |
| 5,039,277 A | 8/1991 | Naudet |
| 5,259,187 A | 11/1993 | Dunbar et al. |
| 5,328,327 A | 7/1994 | Naudet |
| 5,380,152 A | 1/1995 | Sikorski et al. |
| 5,387,080 A | 2/1995 | Bouhennicha et al. |
| 5,485,958 A | 1/1996 | Nightingale |
| 5,601,401 A | 2/1997 | Matheny et al. |
| 5,630,701 A | 5/1997 | Lawer |
| 5,993,152 A | 11/1999 | Schilling |
| 6,283,705 B1 | 9/2001 | Rice et al. |
| 6,321,449 B2 | 11/2001 | Zhao et al. |
| 6,413,043 B1 | 7/2002 | Bouyer |
| 6,688,846 B2 | 2/2004 | Caubet et al. |
| 6,790,000 B2 | 9/2004 | Wolf |
| 6,799,945 B2 | 10/2004 | Chatel et al. |
| 6,843,638 B2 | 1/2005 | Hidalgo et al. |
| 7,104,754 B2 | 9/2006 | Willshee et al. |
| 7,588,415 B2 * | 9/2009 | Giaimo et al. .............. 415/160 |
| 7,628,579 B2 * | 12/2009 | Giaimo et al. .............. 415/160 |
| 7,665,959 B2 * | 2/2010 | Giaimo et al. .............. 415/160 |
| 7,690,889 B2 * | 4/2010 | Giaimo et al. .............. 415/160 |
| 7,753,647 B2 * | 7/2010 | Giaimo et al. .............. 415/160 |
| 2002/0182064 A1 | 12/2002 | Schipani et al. |
| 2003/0113204 A1 | 6/2003 | Wolf |

FOREIGN PATENT DOCUMENTS

| | | |
|---|---|---|
| GB | 907323 | 10/1962 |
| GB | 913147 | 12/1962 |
| GB | 1153134 | 5/1969 |
| GB | 2294094 A | 4/1996 |

* cited by examiner

INNER DIAMETER VANE SHROUD SYSTEM HAVING ENCLOSED SYNCHRONIZING MECHANISM

CROSS-REFERENCE TO RELATED APPLICATION(S)

This is a continuation under 35 U.S.C. 120 of U.S. Pat. No. 7,588,415 having application Ser. No. 11/185,623, entitled "SYNCH RING VARIABLE VANE SYNCHRONIZING MECHANISM FOR INNER DIAMETER VANE SHROUD," filed Jul. 20, 2005 by J. Giaimo and J. Tirone III.

The present application is related to the following applications filed on Jul. 20, 2005: "RACK AND PINION VARIABLE VANE SYNCHRONIZING MECHANISM FOR INNER DIAMETER VANE SHROUD" by inventors J. Giaimo and J. Tirone III (Ser. No. 11/185,622) now U.S. Pat. No. 7,665,959; "GEAR TRAIN VARIABLE VANE SYNCHRONIZING MECHANISM FOR INNER DIAMETER VANE SHROUD" by inventors J. Giaimo and J. Tirone III (Ser. No. 11/185,624), now U.S. Pat. No. 7,628,579; "INNER DIAMETER VARIABLE VANE ACTUATION MECHANISM" by inventors J. Giaimo and J. Tirone III (Ser. No. 11/185,995), now U.S. Pat. No. 7,690,889; "LIGHTWEIGHT CAST INNER DIAMETER VANE SHROUD FOR VARIABLE STATOR VANES" by inventors J. Giaimo and J. Tirone III (Ser. No. 11/185,956), now U.S. Pat. No. 7,753,647. All of these applications are incorporated herein by this reference.

STATEMENT OF GOVERNMENT INTEREST

The U.S. Government has a paid-up license in this invention and the right in limited circumstances to require the patent owner to license others on reasonable terms as provided for by the terms of N00019-02-C-3003 awarded by the United States Navy.

BACKGROUND

This invention relates generally to gas turbine engines and more particularly to variable stator vane assemblies for use in such engines.

Gas turbine engines operate by combusting a fuel source in compressed air to create heated gases with increased pressure and density. The heated gases are ultimately forced through an exhaust nozzle, which is used to step up the velocity of the exiting gases and in-turn produce thrust for driving an aircraft. The heated gases are also used to drive a turbine for rotating a fan to provide air to a compressor section of the gas turbine engine. Additionally, the heated gases are used to drive a turbine for driving rotor blades inside the compressor section, which provides the compressed air used during combustion. The compressor section of a gas turbine engine typically comprises a series of rotor blade and stator vane stages. At each stage, rotating blades push air past the stationary vanes. Each rotor/stator stage increases the pressure and density of the air. Stators serve two purposes: they convert the kinetic energy of the air into pressure, and they redirect the trajectory of the air coming off the rotors for flow into the next compressor stage.

The speed range of an aircraft powered by a gas turbine engine is directly related to the level of air pressure generated in the compressor section. For different aircraft speeds, the velocity of the airflow through the gas turbine engine varies. Thus, the incidence of the air onto rotor blades of subsequent compressor stages differs at different aircraft speeds. One way of achieving more efficient performance of the gas turbine engine over the entire speed range, especially at high speed/high pressure ranges, is to use variable stator vanes which can optimize the incidence of the airflow onto subsequent compressor stage rotors.

Variable stator vanes are typically circumferentially arranged between an outer diameter fan case and an inner diameter vane shroud. Traditionally, mechanisms coordinating the synchronized movement of the variable stator vanes have been located on the outside of the fan case. These systems increase the overall diameter of the compressor section, which is not always desirable or permissible. Also, retrofitting gas turbine engines that use stationary stator vanes for use with variable stator vanes is not always possible. Retrofit variable vane mechanisms positioned on the outside of the fan case interfere with other external components of the gas turbine engine located on the outside of the fan case. Relocating these other external components is often impossible or too costly. Synchronizing mechanisms also add considerable weight to the gas turbine engine. Thus, there is a need for a lightweight variable vane synchronizing mechanism that does not increase the diameter of the compressor section and does not interfere with other external components of the gas turbine engine.

SUMMARY

The present invention is related to a variable vane mechanism for use with a gas turbine engine. The variable vane mechanism comprises a variable vane, an inner diameter shroud and a synchronizing mechanism. The variable vane comprises a vane body and an inner diameter trunnion extending radially inwardly from the vane body. The shroud comprises a shroud body, a socket extending into the shroud body for receiving the inner diameter trunnion and a synchronizing channel extending through the inner diameter shroud aft of the socket so as to be bounded by the shroud body and opening to the socket. The synchronizing mechanism is disposed inside the synchronizing channel and connects to the inner diameter trunnion. In another embodiment, the variable vane includes a button connected to the inner diameter trunnion and displaced radially inwardly from the inner diameter trunnion, and the shroud includes a flange extending into the socket for engaging the button and inhibiting radial movement of the variable vane.

DETAILED DESCRIPTION

Figure 1:
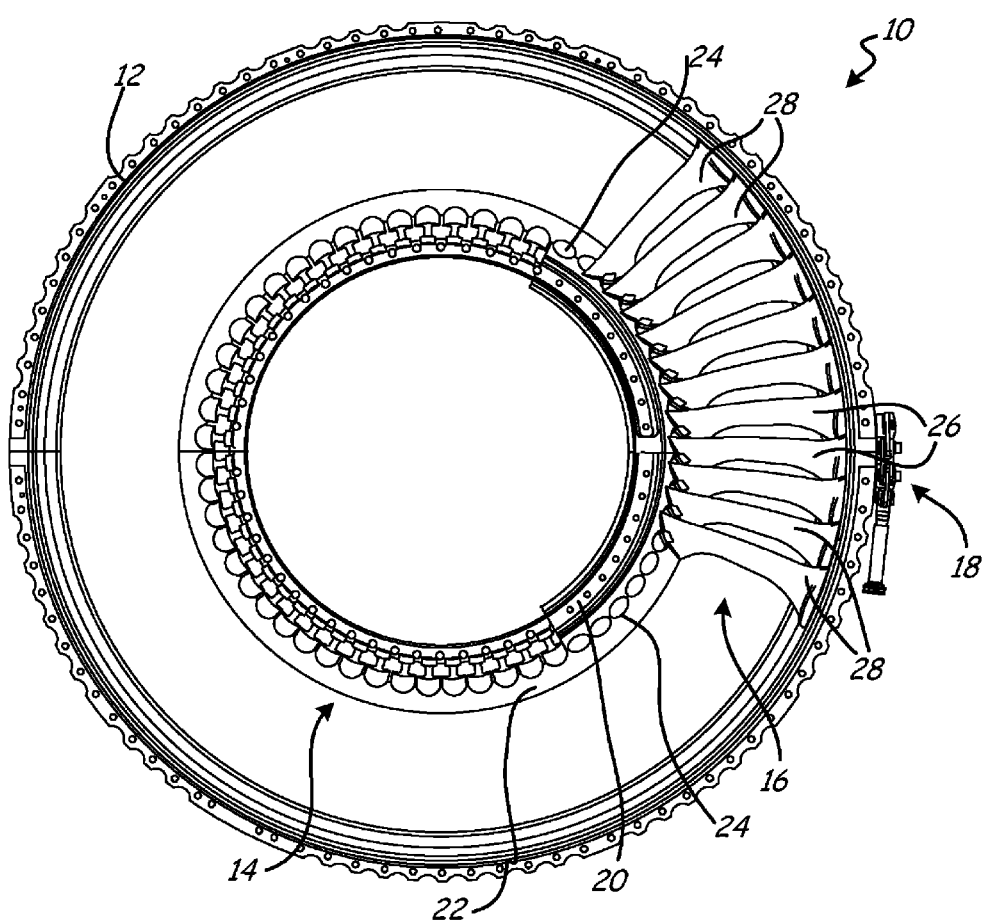
FIG. 1 shows a partially cut away front view of a stator vane section of a gas turbine engine in which the present invention is used.

FIG. 1 shows a partially cut away front view of stator vane section 10 of a gas turbine engine in which the present invention is used. Stator vane section 10 comprises fan case 12, vane shroud 14, variable vane array 16 and actuator 18. Vane shroud 14 is comprised of forward vane shroud component 20 and aft vane shroud component 22, which form inner diameter vane sockets 24. A half-socket, or recess, is located on each of forward vane shroud component 20 and aft vane shroud component 22 to form socket 24. In FIG. 1, only a portion of forward vane shroud component 20 is shown so that the interior of sockets 24 can be seen.

Variable vane array 16 is comprised of drive vanes 26 and a plurality of follower vanes 28. Drive vanes 26 and follower vanes 28 are connected inside inner diameter vane shroud 14 by the synch ring variable vane synchronizing mechanism of the present invention. Thus, when actuator 18 rotates drive vanes 26, follower vanes 28 rotate a like amount.

Typically, follower vanes 28 encircle the entirety of vane shroud 14. Only a portion of variable vane array 16 is shown so that sockets 24 can be seen. Drive vanes 26 and follower vanes 28 are rotatably mounted at the outer diameter of stator vane section 10 in fan case 12, and at the inner diameter of stator vane section 10 in vane shroud 14. The number of drive vanes 26 varies in other embodiments and can be as few as one. In one embodiment, variable vane array 16 includes fifty-two follower vanes 28 and two drive vanes 26. Drive vanes 26 are similar in construction to follower vanes 28. In one embodiment, drive vanes 26 are of heavy duty construction to withstand forces applied by actuator 18.

Inner diameter vane shroud 14 can be constructed in component sizes less than the entire circumference of inner diameter vane shroud. In one embodiment, as shown in FIG. 1, forward vane shroud component 20 is made of sections approximately one sixth (i.e. 60 degrees) of the circumference of inner diameter vane shroud 14. In such a case, two sections have nine half-sockets 24 and one section has eight half-sockets 24. Smaller forward vane shroud components 20 assist in positioning forward vane shroud component 20 under the inner diameter ends of drive vanes 26 and follower vanes 28 when they are inserted in sockets 24. In one embodiment for use in split fan case designs, aft shroud component 22 is made of sections approximately one half (i.e. 180 degrees) the circumference of inner diameter vane shroud 14, in which case each section has twenty six half-sockets 24. The synch ring variable vane synchronizing mechanism of the present invention is constructed in smaller segments, such as approximately one half (i.e. 180 degrees) segments, for use in split fan case designs. Additionally, in other embodiments, forward vane shroud component 20 and aft vane shroud component 22 can be made as full rings (i.e. 360 degrees), along with synch ring variable vane synchronizing mechanism, for use in full ring fan case designs.

Stator vane section 10 is typically located in a compressor section of a gas turbine engine downstream of, or behind, a rotor blade section. Air is forced into stator vane section 10 by a preceding rotor blade section or by a fan. The air that passes through stator vane section 10 typically passes on to an additional rotor blade section. Drive vanes 26 and follower vanes 28 rotate along their respective radial positions in order to control the flow of air through the compressor section of the gas turbine engine. The synch ring variable vane synchronizing mechanism of the present invention coordinates their rotation.

Figure 2:
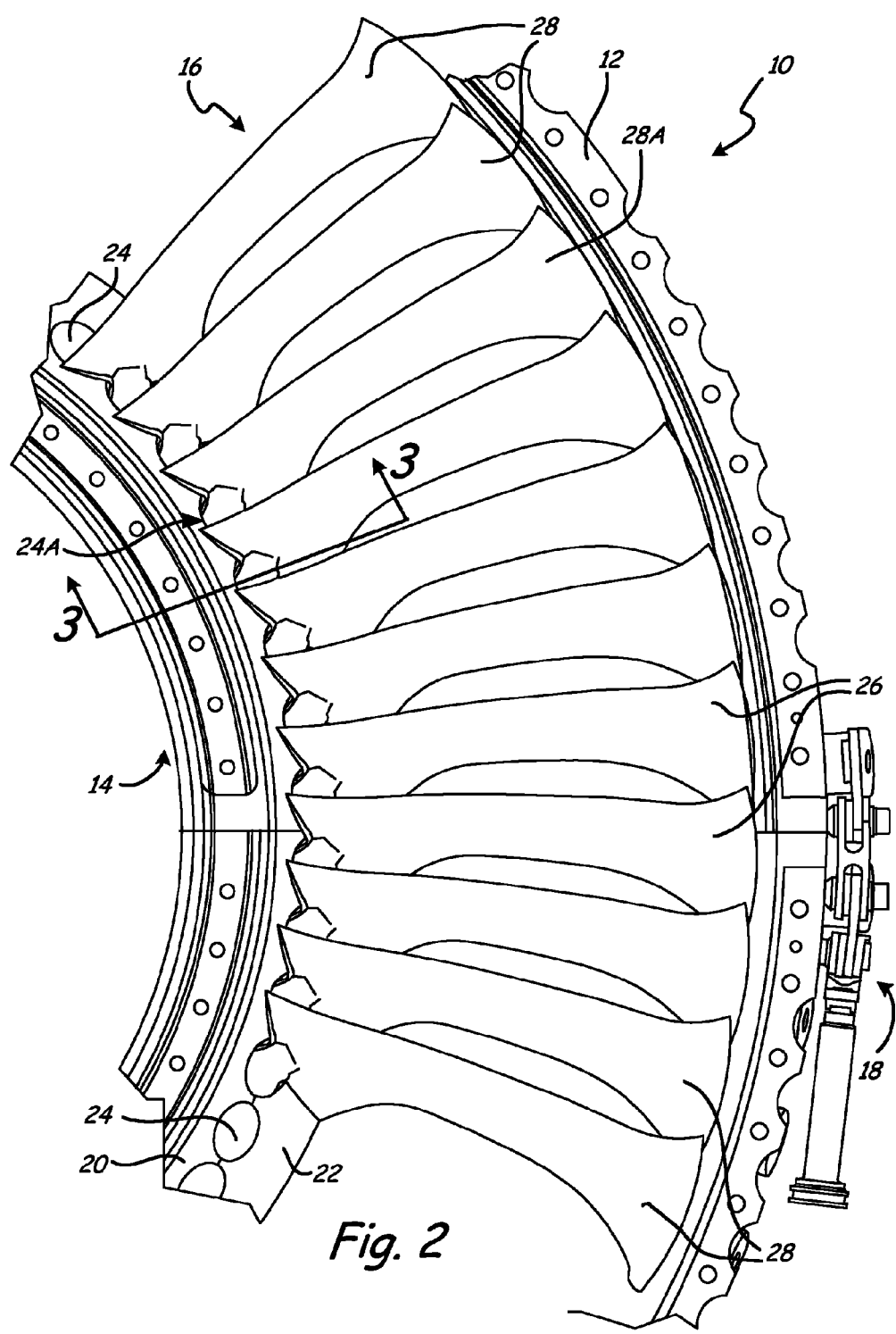
FIG. 2 shows a close up of a portion of stator vane array positioned between a fan case and the inner diameter vane shroud of the present invention.

FIG. 2 shows a close up of a portion of stator vane array 16 positioned between fan case 12 and inner diameter vane shroud 14 of the present invention. Drive vanes 26 and follower vanes 28 are rotatable in sockets 24 of inner diameter vane shroud 14 at an inner diameter end. Drive vanes 26 and follower vanes 28 are rotatable in fan case 12 at an outer diameter end. Section 3-3 is taken at a position along inner diameter vane shroud 14 where inner diameter end of follower vane 28A is inserted in socket 24A. Forward shroud component 20 and aft shroud component 22 come together to form sockets 24 for securing the inner ends of variable vane array 16.

Figure 3:
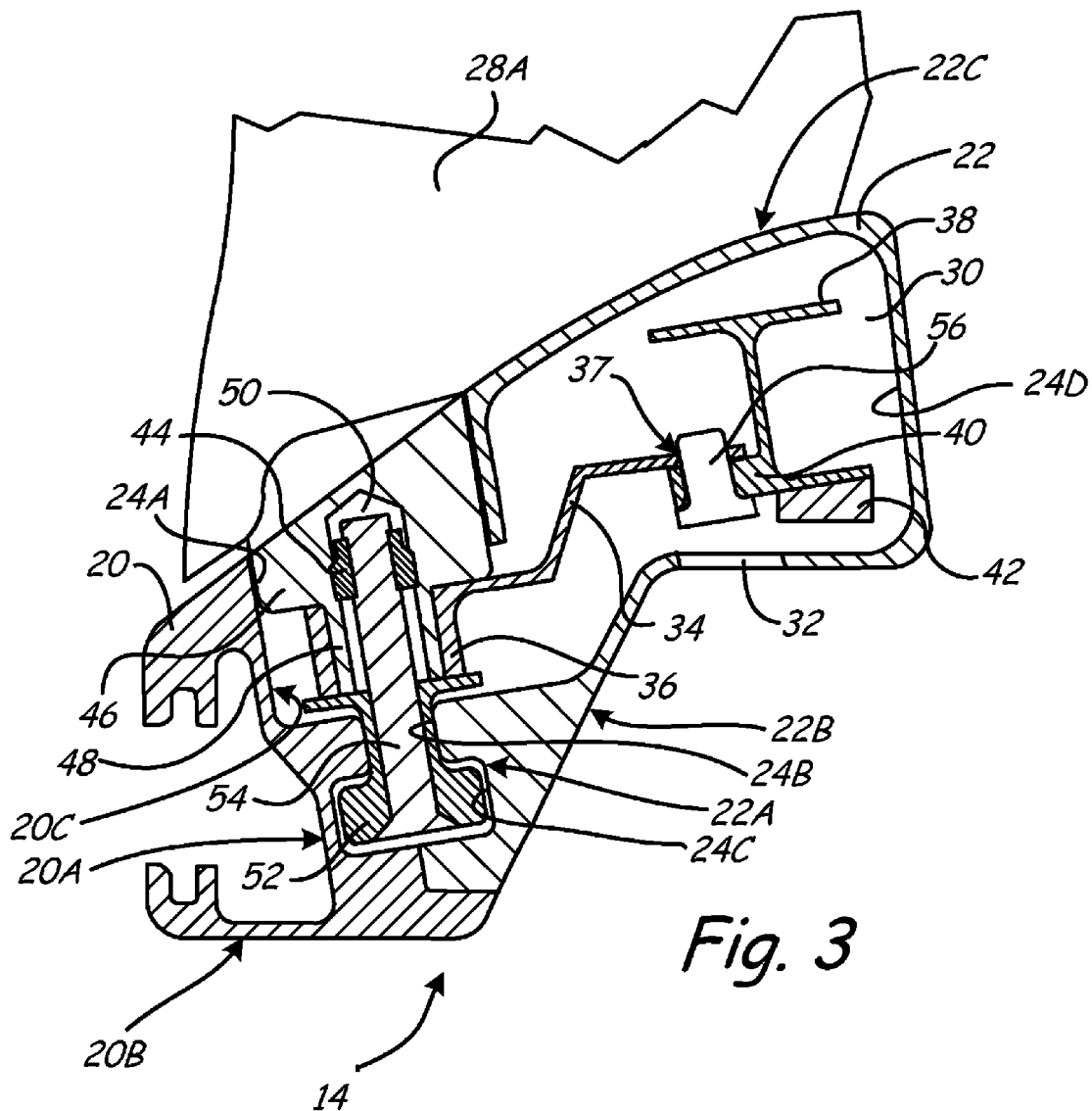
FIG. 3 shows section 3-3 of FIG. 2 showing a cross section of the inner diameter vane shroud at the vane sockets.

FIG. 3 shows section 3-3 of FIG. 2 showing a cross section of inner diameter vane shroud 14 at vane socket 24A. Inner diameter vane shroud 14 includes forward shroud component 20, aft shroud component 22, socket 24A, inner channel 30 and clearance hole 32. Forward shroud component 20 includes first forward wall 20A, bottom wall 20B and aft facing surface 20C. Aft shroud component 22 includes second forward wall 22A, multi-faceted aft wall 22B and top wall 22C. Socket 24A connects to neck bore 24B, button cavity 24C and C-shaped channel 24D, which is formed by inner channel 30. Vane arm 34 includes trunnion hoop 36 and pin hole 37. Synch ring 38 includes lug 40 and bumper 42. Follower vane 28A includes locking insert 44, trunnion 46, vane arm post 48 and fastener channel 50.

Locking insert 44 is secured inside of fastener channel 50. Trunnion hoop 36 of vane arm 34 is inserted over vane arm post 48. Button 52 is secured around the head of fastener 54. Fastener 54 is then inserted into fastener channel 50 and threaded into locking insert 44. Button 52 forces trunnion hoop 36 against trunnion 46 and secures it around vane arm post 48. In one embodiment, vane arm post 48 and trunnion hoop 36 have a square profile such that when trunnion hoop 36 is inserted around vane arm post 48 they cannot rotate relative to one another. Follower vane 28A, vane arm 34, fastener 54 and button 52 are installed into fan case 12. This process is repeated for all follower vanes 28 and drive vanes 26. Bumper 42 is positioned on a lower surface of synch ring 38 to assist synch ring 38 in maintaining a circular path through inner channel 30. Synch ring 38 is positioned inside of aft shroud component 22. Aft shroud component 22, along with synch ring 38, is then positioned against trunnions 46. Pin 56 is positioned through clearance hole 32, and into pin hole 37, securely fastening vane arm 34 to lug 40. Pin 56 is tight fitting in lug 40 and vane arm 34 is allowed to pivot at pin 56. The plurality of follower vanes 28 and drive vanes 26 of variable vane array 16 are linked to synch ring 38 in similar fashion.

Forward shroud component 20 is positioned against aft shroud component 22 such that socket 24A fits around button 52. Button 52 is used to pivotably secure follower vane 28A inside socket 24A. Forward shroud component 20 is fastened to aft shroud component 22 as is known in the art.

During operation of synch ring variable vane synchronizing mechanism, actuator 18 rotates drive vanes 26. Vane arms 34 of drive vanes 26 are likewise rotated about trunnion 46. Synch ring 38 is pushed by vane arms 34 of drive vanes 26 and rotates inside inner channel 30. Synch ring 38 thereby pulls vane arms 34 connected to follower vanes 28, which in turn rotates follower vanes 28 the same amount that drive vanes 26 are rotated by actuator 18. Thus, the direction of the flow of air exiting stator vane section 10 can be controlled for entry into the next section of the gas turbine engine utilizing the synch ring variable vane synchronizing mechanism.

The synch ring variable vane synchronizing mechanism of the present invention can be constructed in smaller segments. In one embodiment, synch ring 38 is divided into first and second segments for use in split fan case designs.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An inner diameter vane shroud system having an enclosed synchronizing mechanism, the inner diameter vane shroud system comprising:
   a shroud comprising:
      an arcuate body;
      a socket extending into the arcuate body to have a radially outward facing opening, the socket including:
         a neck bore extending into a base of the socket; and
         a button cavity connected to the neck bore; and
      a synchronizing channel extending circumferentially through the arcuate body and connected to the socket;
   a variable vane comprising:
      an inner diameter trunnion disposed within the socket, the trunnion including:
         a neck portion extending radially from the trunnion and disposed within the neck bore; and
         a button connected to the neck portion and disposed within the button cavity; and
   a synchronizing mechanism disposed within the synchronizing channel and connected to the inner diameter trunnion;
   wherein the inner diameter trunnion covers the socket to prevent access through the socket to the synchronizing cavity within the arcuate body.

2. The inner diameter vane shroud system of claim 1 wherein the arcuate body comprises:
   a forward wall extending along the socket;
   a bottom wall extending from the forward wall and along the button cavity;
   an aft wall extending from the bottom wall and along the synchronizing channel and the socket; and
   a top wall extending from the aft wall to the radially outward facing opening to encapsulate the synchronizing mechanism within the arcuate body.

3. The inner diameter vane shroud system of claim 2 wherein the arcuate body is separated into two components along a split line extending through the socket.

4. The inner diameter vane shroud system of claim 2 wherein the arcuate body includes a forward facing C-shaped channel extending through the forward wall.

5. The inner diameter vane shroud system of claim 3 wherein the synchronizing channel is connected to the socket between the neck bore and the radially outward facing opening.

6. The inner diameter vane shroud system of claim 5 wherein the synchronizing mechanism comprises:
   a synchronizing ring disposed within the synchronizing channel; and
   a vane arm comprising:
      a first end connected to the inner diameter trunnion; and
      a second end connected to the synchronizing ring.

7. The inner diameter vane shroud system of claim 6 and further comprising:
   an access port extending through the arcuate body to enter the synchronizing channel; and
   a removable cap disposed within the access port to seal the synchronizing channel.

8. The inner diameter vane shroud system of claim 6 wherein the inner diameter trunnion includes an arm post connecting the neck portion to the trunnion.

9. The inner diameter vane shroud system of claim 8 wherein the first end of the vane arm is connected to the arm post.

10. The inner diameter vane shroud system of claim 8 wherein the neck portion and the button are connected to the arm post using a threaded fastener.

11. The inner diameter vane shroud system of claim 8 wherein the button has a larger diameter than the neck bore such that radial displacement of the variable vane is inhibited by engagement of the button with a button cavity portion of the arcuate body.

12. A variable vane mechanism comprising:
   a variable vane comprising:
      a vane body;
      an inner diameter trunnion extending radially inwardly from the vane body and
      a button connected to the inner diameter trunnion and displaced radially inwardly from the inner diameter trunnion;
   an inner diameter shroud comprising:
      a shroud body;
      a socket extending into the shroud body for receiving the inner diameter trunnion;
      a flange extending into the socket for engaging the button and inhibiting radial movement of the variable vane; and
      a synchronizing channel extending through the inner diameter shroud aft of the socket so as to be bounded by the shroud body and opening to the socket; and
   a synchronizing mechanism disposed inside the synchronizing channel and connected to the inner diameter trunnion.

13. The variable vane mechanism of claim 12 wherein the shroud body comprises:
   a forward wall extending along a forward portion of the socket;
   a bottom wall extending from the forward wall along a bottom portion of the socket;
   an aft wall extending from the bottom wall along an aft portion of the socket, the aft wall including a plurality of bends to form the synchronizing channel and enfold the synchronizing mechanism; and
   a top wall extending from the aft wall to the socket.

14. The variable vane mechanism of claim 13 wherein the synchronizing mechanism comprises:
   a synchronizing ring disposed within the synchronizing channel; and
   a vane arm comprising:
      a first end connected to the inner diameter trunnion; and
      a second end connected to the synchronizing ring.

15. The variable vane mechanism of claim 14 and further comprising:
   an access port extending through the shroud body to enter the synchronizing channel; and
   a removable cap disposed within the access port to seal the synchronizing channel.

16. The variable vane mechanism of claim 15 wherein:
   the inner diameter trunnion includes an arm post to which the first end of the vane arm is connected; and
   the button comprises a double-flanged body connected to the arm post with a fastener, the flange of the inner diameter shroud engaging the double-flanged body.

17. An inner diameter vane shroud for use with a variable vane system in a gas turbine engine, the inner diameter vane shroud comprising:
   a forward shroud component comprising:
      a first forward wall extending in a generally radial direction;
      a first semi-circular half-socket disposed on an aft facing surface of the first forward wall; and a first button pocket disposed on the aft facing surface; and an aft shroud component comprising:
   a second forward wall for engaging the aft facing surface of the forward shroud component;
   a second button pocket disposed on a forward facing surface of the second forward wall for engaging the first button pocket;
   a multi-faceted aft wall extending from the second forward wall and shaped to form a synchronizing channel; and
   a socket flange extending from the multi-faceted aft wall, the socket flange including a second semi-circular half-socket for engaging the first semi-circular half-socket to form a trunnion socket, the second semi-circular half-socket suspended over the synchronizing channel by the multi-faceted aft wall such that the trunnion socket opens to the synchronizing channel.

18. The inner diameter vane shroud of claim 17 wherein:
   the forward shroud component includes a bottom flange extending in a generally axial direction from the first forward wall to engage the second forward wall of the aft shroud component.

19. The inner diameter vane shroud of claim 18 and further comprising:
   a first button flange extending from the aft facing surface of the forward shroud component between the first semi-circular half-socket and the first button pocket; and
   a second button flange extending from the forward facing surface of the aft shroud component between the second semi-circular half-socket and the second button pocket;
   wherein the first button flange and the second button flange engage to form a bore for receiving and restraining radial movement of an inner diameter trunnion of a variable vane disposed within the trunnion socket.

* * * * *